US009563888B2

(12) United States Patent
Reeve et al.

(10) Patent No.: US 9,563,888 B2
(45) Date of Patent: Feb. 7, 2017

(54) MOBILE TRANSACTIONS (75) Inventors: Gregory Reeve, Newbury (GB); Peter Cornforth, Newbury (GB); Jason Downing, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 186 days.

(21) Appl. No.: 13/880,892

(22) PCT Filed: Oct. 24, 2011

(86) PCT No.: PCT/GB2011/052064
§ 371 (c)(1),
(2), (4) Date: Jul. 2, 2013

(87) PCT Pub. No.: WO2012/052787
PCT Pub. Date: Apr. 26, 2012

(65) Prior Publication Data
US 2014/0195427 A1  Jul. 10, 2014

(30) Foreign Application Priority Data

Oct. 22, 2010  (GB) .................... 1017878.8

(51) Int. Cl.
*G06Q 40/00* (2012.01)
*G06Q 20/32* (2012.01)
(Continued)

(52) U.S. Cl.
CPC .......... *G06Q 20/32* (2013.01); *G06Q 20/3224* (2013.01); *G06Q 20/145* (2013.01);
(Continued)

(58) Field of Classification Search
CPC .. G06Q 20/32; G06Q 20/322; G06Q 30/0222;
G06Q 30/0261; G06Q 40/00; G06Q 20/145; G06Q 40/02; H04W 4/12; H04W 48/16; H04W 48/20; H04W 4/02; H04W 4/027
(Continued)

(56) References Cited

U.S. PATENT DOCUMENTS 6,256,503 B1   7/2001  Stephens
6,895,333 B2 *  5/2005  Hethuin .................... G01S 5/02
455/404.2
(Continued)

FOREIGN PATENT DOCUMENTS

CN   1351789 A   5/2002
EP   1703440 A2  9/2006
(Continued)

OTHER PUBLICATIONS

Jagetiya, V., & Nacham, R. (1401). Systems and methods for generating called device location based on cell sector information Retrieved from http://dialog.proquest.com/professional/docview/1520986367?accountid=142257 on Sep. 19, 2016.*

(Continued)

*Primary Examiner* — Kito R Robinson
(74) *Attorney, Agent, or Firm* — Workman Nydegger (57) ABSTRACT

A method for analyzing mobile handset based transactions between sender handsets and receiver handsets comprising the steps of: identifying locations of a sender handset and a receiver handset for each transaction using mobile base station information; determine a geographical distribution of mobile handset based transactions based on the identified locations; and identifying anomalies by comparing the determined geographical distribution with an expected geographical distribution.

12 Claims, 7 Drawing Sheets

(51) Int. Cl.
*H04W 48/20* (2009.01)
*G06Q 30/02* (2012.01)
*G06Q 40/02* (2012.01)
*H04W 4/12* (2009.01)
*H04W 4/02* (2009.01)
*G06Q 20/14* (2012.01)
*H04W 48/16* (2009.01)

(52) U.S. Cl.
CPC ....... *G06Q 20/322* (2013.01); *G06Q 30/0222* (2013.01); *G06Q 30/0261* (2013.01); *G06Q 40/00* (2013.01); *G06Q 40/02* (2013.01); *H04W 4/02* (2013.01); *H04W 4/027* (2013.01); *H04W 4/12* (2013.01); *H04W 48/16* (2013.01); *H04W 48/20* (2013.01)

(58) Field of Classification Search
USPC ........................................................ 705/42
See application file for complete search history.

(56) References Cited

U.S. PATENT DOCUMENTS

| | | | | |
|---|---|---|---|---|
| 7,113,782 | B2* | 9/2006 | Lucidarme | H04W 16/18 370/331 |
| 7,796,978 | B2* | 9/2010 | Jones | G01S 5/30 455/414.3 |
| 8,025,220 | B2* | 9/2011 | Blume | G06Q 20/04 235/375 |
| 8,094,635 | B2* | 1/2012 | Chin | H04W 4/14 370/338 |
| 8,374,634 | B2* | 2/2013 | Dankar | G06Q 20/3224 370/328 |
| 8,447,777 | B2* | 5/2013 | White | G06F 17/30873 707/769 |
| 8,493,904 | B2* | 7/2013 | Kang | H04W 72/042 370/313 |
| 8,818,398 | B1* | 8/2014 | Nelson | G01S 5/0036 342/464 |
| 2002/0069162 | A1* | 6/2002 | Boylan | G06Q 20/10 705/39 |
| 2003/0014213 | A1 | 1/2003 | Yokota | |
| 2003/0040310 | A1* | 2/2003 | Barakat | H04W 92/12 455/426.1 |
| 2003/0220092 | A1* | 11/2003 | Hethuin | G01S 5/02 455/404.2 |
| 2004/0137929 | A1* | 7/2004 | Jones | H04N 21/6582 455/517 |
| 2004/0186753 | A1* | 9/2004 | Kim | G06Q 40/08 705/4 |
| 2006/0050996 | A1* | 3/2006 | King | H04N 1/00244 382/312 |
| 2006/0065733 | A1* | 3/2006 | Lee | G06F 17/30879 235/462.01 |
| 2006/0106605 | A1* | 5/2006 | Saunders | G10L 17/04 704/246 |
| 2007/0112762 | A1* | 5/2007 | Brubaker | G06Q 30/02 |
| 2008/0032708 | A1* | 2/2008 | Guvenc | G01S 5/0215 455/456.2 |
| 2008/0110978 | A1* | 5/2008 | Blume | G06Q 20/04 235/380 |
| 2008/0162346 | A1 | 7/2008 | Aaron et al. | |
| 2008/0227471 | A1* | 9/2008 | Dankar | G06Q 20/3224 455/456.6 |
| 2009/0076912 | A1* | 3/2009 | Rajan | G06Q 30/0267 705/14.64 |
| 2009/0157547 | A1 | 6/2009 | Ruckart | |
| 2010/0069097 | A1* | 3/2010 | Chin | H04W 4/14 455/466 |
| 2010/0144367 | A1* | 6/2010 | Goh | G01S 5/0294 455/456.1 |
| 2010/0162348 | A1 | 6/2010 | Narayanan et al. | |
| 2010/0312715 | A1* | 12/2010 | Esque | G06Q 10/08 705/330 |
| 2011/0078043 | A1* | 3/2011 | Ra | G06Q 20/10 705/26.41 |
| 2011/0143711 | A1* | 6/2011 | Hirson | G06Q 20/32 455/410 |
| 2012/0052879 | A1* | 3/2012 | Wildon | A45C 13/18 455/456.1 |
| 2012/0270559 | A1* | 10/2012 | Ingerson | G08B 21/0269 455/456.1 |

FOREIGN PATENT DOCUMENTS

| | | |
|---|---|---|
| FR | 2860324 A1 | 4/2005 |
| KR | 20040076694 A | 9/2004 |
| WO | WO00/08818 A1 | 2/2000 |
| WO | WO2008/044581 A1 | 4/2008 |
| WO | WO 2010/116900 | 10/2010 |
| WO | WO 2011/068624 A2 | 6/2011 |

OTHER PUBLICATIONS

Oh, D., Steele, T., Hayne, K., & Anderson, L.Localized SMS messaging based on location of a mobile station Retrieved from http://dialog.proquest.com/professional/docview/1740215160?accountid=142257 on Sep. 19, 2016.*
Hunter, P. (2001). Location, location, location. Computer Weekly, , 64. Retrieved from http://dialog.proquest.com/professional/docview/675441869?accountid=142257 on Sep. 19, 2016.*
GB Search Report for Application No. GB1017878.8 dated Feb. 4, 2011.
GB Search Report for Application No. GB1017878.8 dated Dec. 10, 2012.
State Intellectual Property Office of the People's Republic of China Search Report for 201180054825.6 dated Mar. 11, 2015.
ARIPO Search Report for AP/P/2013/006874 dated Mar. 7, 2015.

* cited by examiner

MOBILE TRANSACTIONS

CROSS REFERENCE TO RELATED APPLICATIONS

This application is a U.S. Nationalization of PCT Application Number PCT/GB2011/052064, filed on Oct. 24, 2011, which claims priority to United Kingdom Patent Application No. 1017878.8, filed on Oct. 22, 2010, the entireties of which are incorporated herein by reference.

FIELD OF THE INVENTION

The present invention relates to a method for analysing and securing mobile handset based transactions.

BACKGROUND OF THE INVENTION

Cell phone based money transfer systems such as M-PESA provide a facility for transferring funds between mobile users. Cash may be exchanged for electronic money, which may be sent to family and friends, to pay bills or to purchase mobile air-time, for example. Such systems are designed to work on limited functionality mobile handsets using an installed SIM toolkit to provide additional menus dedicated to funds transfer, USSD sessions or interactive voice response (IVR) systems. SMS messages may be used to confirm to a sender and a receiver that an amount has been transferred following a transaction or payment. Cash may be redeemed or exchanged for electronic money (or "e-money") at outlets, which may be grocery stores or air-time resellers, for example.

An example of such a system is described at http://www.vodafone.com/start/about_vodafone/what_we_do/vmt.html.

Such money transfer systems are typically in use in countries with a limited banking infrastructure, where the population may not have access to basic financial services.

Such systems are gaining popularity with millions of transactions occurring daily. These transactions are monitored for the purposes of complying with anti-money laundering/counter terrorist financing requirements, but the aggregated data may not be analysed otherwise. Furthermore, aggregated transactions may not necessarily be analysed on a regional or national scale. Compliance with transaction monitoring, identification and verification of customers is an ongoing process in money transfer systems.

Therefore, there is required a system and method that overcomes these problems.

SUMMARY OF THE INVENTION

In accordance with a first aspect of the present invention there is provided a method for analysing mobile handset based transactions between sender handsets and receiver handsets comprising the steps of:

identifying locations of a sender handset and a receiver handset for each transaction using mobile base station information;

determine a geographical distribution of mobile handset based transactions based on the identified locations; and identifying anomalies by comparing the determined geographical distribution with an expected geographical distribution. Where anomalies are found these may be indicative of a disaster or other significant event. The use of base station information enables the use of limited functionality handsets that may not have other types of location hardware present. The method may be carried out within a separate server or within one or more of the base stations or a combination of both.

Preferably, the geographical distribution and expected geographical distribution may be geographical densities of transactions. Other geographical distributions may be used.

Optionally, the identifying step may further include determining whether the geographical distribution and the expected geographical distribution are within a predetermined limit. This predetermined limit may include the number or frequency of transactions or the number of expected transactions between particular areas. These predetermined limits may be stored in a database or file, for example. For example, the predetermined limits may be a percentage of average or usual transactions volumes or densities such as for instance +/−10%, 20%, or 30-100% or more.

Preferably, the identifying step may use mobile base station information recorded when the transactions were executed. Therefore, accuracy of the information may be improved.

Optionally, the identifying step uses mobile base station information recorded when a confirmation SMS is sent to the sender handset and to the receiver handset and the mobile base station information is an identifier of each mobile based used to transmit the SMS messages. Typically, the base station sending SMS messages will be the closest base station to the handset providing an indication of location. As the SMS confirmation messages need to be sent as part of or to confirm the transaction, these messages must be sent by mobile base stations located near to the handsets. Therefore, this reduces additional processing overheads as base station information may be already available.

Optionally, the base station information may use triangulation to locate the sender and receive handsets. This may further improve location accuracy.

Optionally, the method may further comprise storing a number of transactions at a base station or at an external server. These data may be uploaded at intervals or when analysis is required.

Preferably, the method may further comprise the step of displaying the geographical distribution on a map. This makes it easier to identify anomalies or abnormalities in geographical distributions of transactions.

Optionally, the method may further comprise the step of highlighting transaction routes between base stations on the map. These may be known as cash corridors. Individual cash corridors may be directly monitored against expected volumes of transactions and direction of cash flow.

Preferably, the anomalies may be shown on the map.

According to a second aspect there is provided a mobile handset transaction system comprising:

a processor arranged to execute transactions between sender handsets and receiver handsets; and a server arranged to identify locations of a sender handset and a receiver handset for each transaction using mobile base station information, determine a geographical distribution of mobile handset based transactions based on the identified locations, and identify anomalies by comparing the determined geographical distribution with an expected geographical distribution. The system may further incorporate hardware or software to implement functionality described with regards to the methods described above. The processor and server may be separate or combined.

According to a third aspect there is provided a method for crediting a user handset account in a mobile transaction processing system comprising the steps of:

receiving a request from an outlet handset to credit the user's account;

determining the location of the outlet handset;

determining the location of the user handset;

comparing the location of the outlet handset with the location of the user handset; and rejecting the request if the locations are different or substantially different. Therefore, fraudulent or erroneous transactions can be identified and/or blocked as the recipient of the funds should be located close to the outlet.

Preferably, the outlet and/or user handset locations are determined by handset-based GPS and/or base station information. GPS information may be more accurate but base station information may be more available as this doesn't rely on additional hardware on either handset.

According to a fourth aspect there is provided a method of validating a mobile transaction comprising the steps of:

receiving a request from a user handset to initiate a mobile transaction;

capturing a photograph of the user with the user handset;

comparing the captured photograph with a pre-stored photograph of the user; and rejecting the transaction if the captured photograph and the pre-stored photograph are not of the same person. The photograph or image may be captured using a camera located on the handset or attached to the handset.

According to a fifth aspect there is provided a method of building a user credit history comprising the steps of:

aggregating mobile transaction information selected from the group consisting of any of: mobile money transactions, mobile calls, mobile top-ups, and SMS messages;

storing the aggregated mobile transaction information on a server. This allows a verifiable credit history of the user to be developed and stored.

The above methods may be implemented using software or firmware stored on computer readable media such as hard disks, for example, or transmitted as a signal. The software may be executed on suitable computer hardware such as servers, computers, mobile devices, routers and/or data storage devices.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale.

DETAILED DESCRIPTION OF THE PREFERRED EMBODIMENTS

Figure 1:
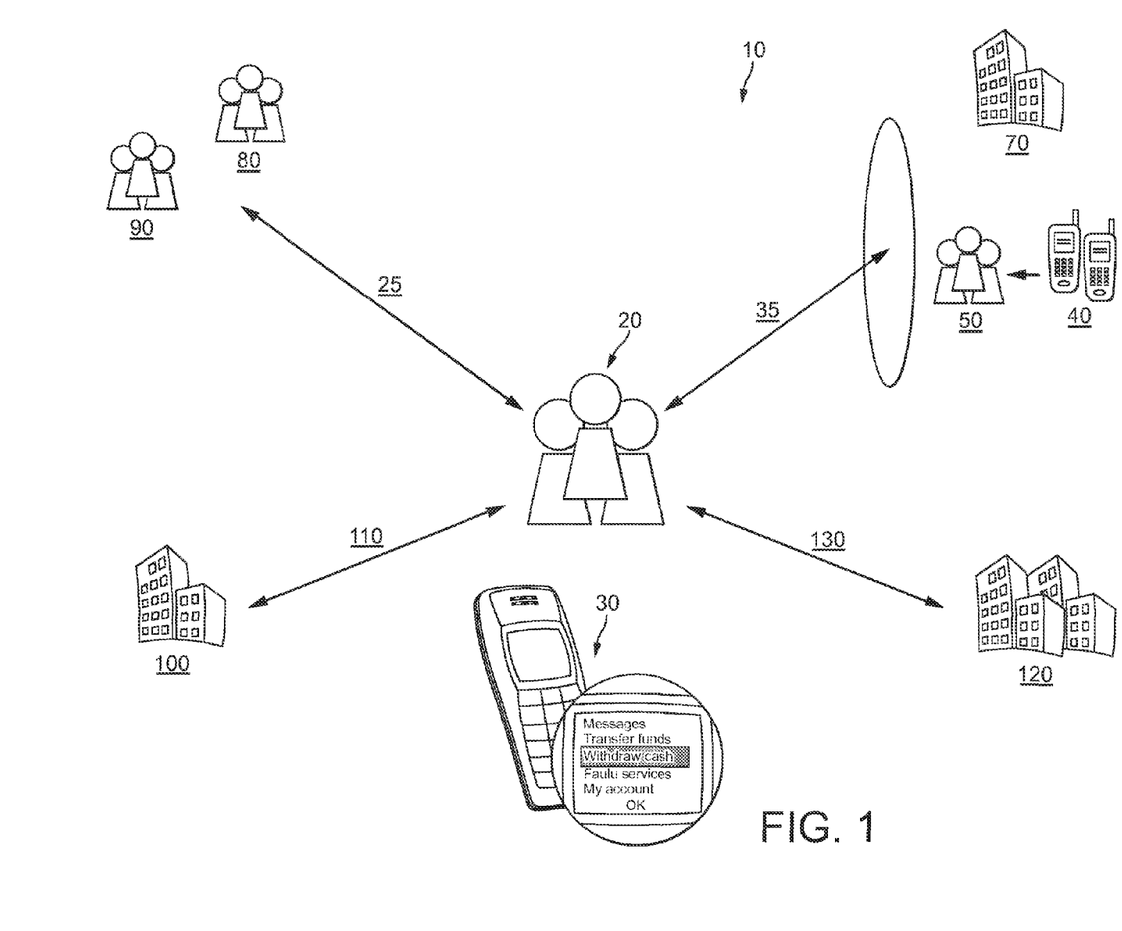
FIG. 1 shows a schematic diagram illustrating an overview of a mobile transaction system.

FIG. 1 shows a schematic diagram providing an overview of a mobile transaction system 10. Users 20 utilise a handset 30 having dedicated menus provided by a SIM toolkit or Unstructured Supplementary Services Data (USSD) sessions. Alternatively, an interactive voice response system (IVR) may be used by the user to send instructions and invoke transactions. Communications between the users' handsets across a mobile network are indicated by arrows 25, 35, 110 and 130. For example, a user 20 may invoke a transaction to send money to other customers 80 of the system 10 or to other mobile users 90 that may not be participants or signed up to the system. This type of money transfer transaction is indicated by arrow 25. The user 20 may use the interactive menus on the handset 30 (or other user interface) to define a receiver of a transaction by entering their mobile telephone number, for example. The amount of the transaction may be entered and a password or other authorisation procedure may be invoked to initiate the transaction. The transaction may be processed by a transaction processing system (not shown in this figure). Once complete, an SMS message is sent to both the sender 20 and the receiver 80, 90.

Funds may be added to a user's account or withdrawn at an outlet or store 70 operated by assistants 50 who may use tills or handsets connected to the mobile network. Again, the procedure may be initiated and executed using handsets 30 and 40 with confirmation sent by SMS to both parties. In this way, cash may be exchanged for e-money or vice-versa from the store or outlet 70.

The system 10 may also be used to buy airtime from a mobile network operator 100 as indicated by arrow 110. Furthermore, bills may be paid to other trading organisations 120 indicated by arrow 130. Again, confirmation to either or both parties may be sent using the mobile network in the form of a SMS message or other mechanism.

Figure 2:
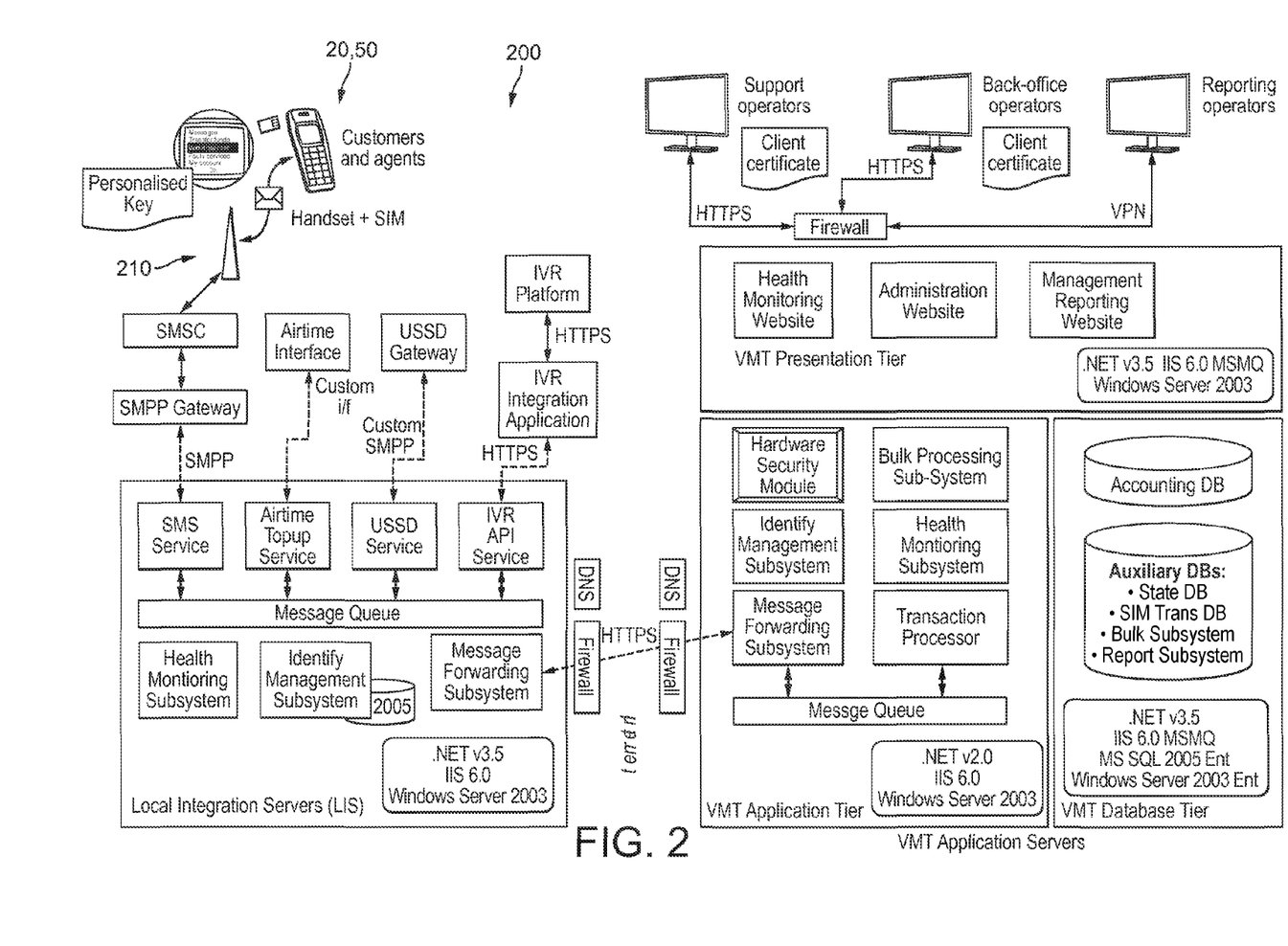
FIG. 2 shows a schematic diagram of a transaction processing system used to process the transactions of FIG. 1, given by way of example only.

FIG. 2 shows a schematic diagram of a transaction processing system 200 used to process transactions. This system includes mobile base stations 210. FIG. 2 shows how confirmation SMS messages are sent to handsets 30, 40 using the mobile base stations 210. Transactions initiated by users 20 and outlets 50 are added to a message queue to be processed asynchronously.

Many of the remaining components shown in FIG. 2 are concerned with data storage, management and reporting functionality.

An identifier of a base station 210 that receives a request for a transaction from a user 20 or sends confirmation of a transaction to a recipient 80, 90 or outlet 50 is stored. As the location of the mobile base station 210 is typically fixed and known then the location of the recipient 80, 90 or sender 20 or outlet 50 may be inferred or at least approximated from this information. For example, the number of transactions passing through particular base stations 210 maybe monitored and stored in order to determine where money is coming from and where it is being sent to.

Alternatively, more accurate location information of receivers and senders may be collected by using base station information 210. For example triangulation (from multiple base stations) and time of flight data may be captured in order to more accurately determine the location of handsets when transactions take place. Again, this information may be recorded.

By pinpointing where a high proportion of mobile money transactions take place, valuable information may be collected and used to build a network of outlets (an outlet being a store that can convert e-money to cash and back again). Currently, the majority of outlet networks will be built based upon how densely populated a given area is, however this method does not take into account an individual's propensity to make a money transfer transaction.

As well as using mobile base stations to pinpoint send and receive transactions for mobile money, it is also possible to group the transactions that are taking place between base stations. By counting the number of transactions going between particular base stations it is possible to identify major and minor routes that money can flow between different locations nationally or internationally herein called "Cash Corridors".

The Cash Corridors are important in understanding elements of national and international economics. The changes in direction of money flows over time are therefore also extremely important as they can help the monitoring of changes in economic circumstance in given areas. For example in Tanzania a common route maybe transactions going from a base station in a Dar Es Salaam, a major urban hub, to a rural area. If the flow of money were to be reversed it may suggest that there was some change in economic or political circumstance that warranted further attention.

Identifying base stations and therefore locations where money is received and the volume of transactions taken at a particular base station or group of base stations can identify areas that are under going a period of economic hardship. For example, a base station in an agricultural area in Kenya that would in good seasons show very few receiving money transactions could reverse completely to show only receiving transactions under drought conditions. This aggregated information may be valuable in helping governments and aid agencies to identify areas that were particularly hard hit and to focus their aid accordingly.

Figure 3:
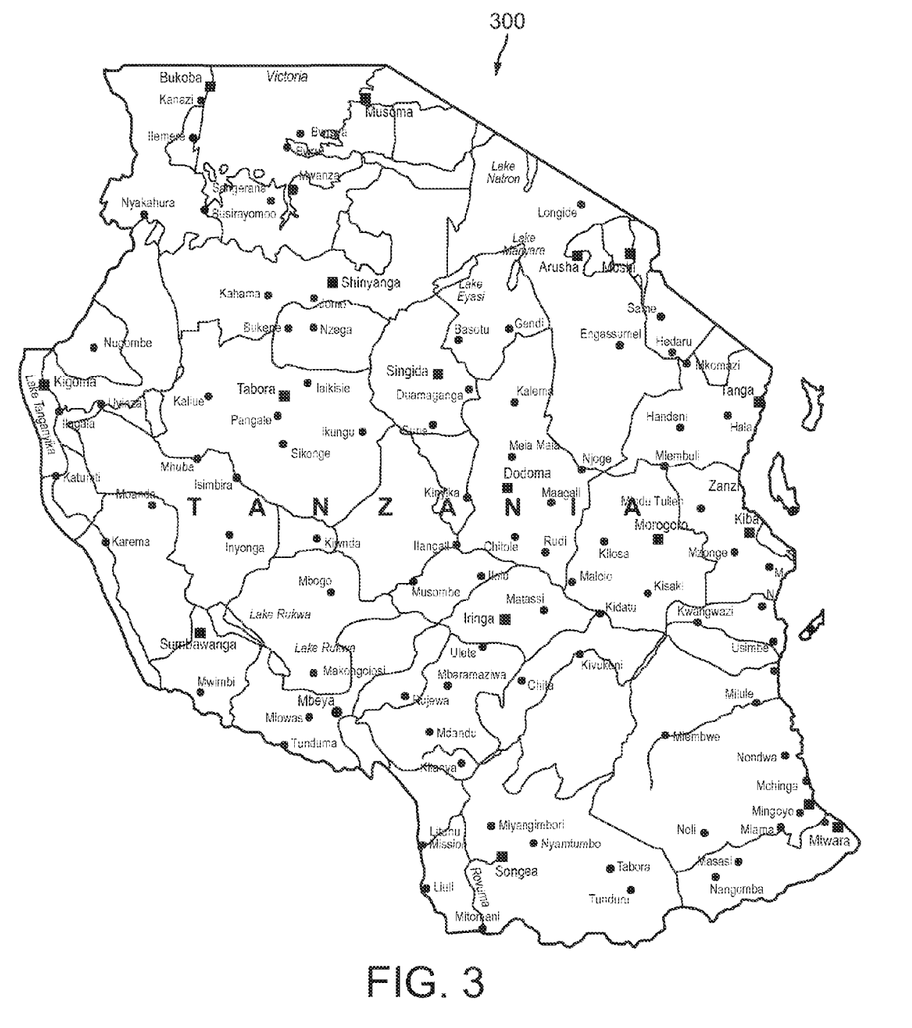
FIG. 3 shows maps indicating geographical distributions of transactions processed using this system of FIG. 1.

FIG. 3 shows a political map 300 of Tanzania, which is an example country that may use the mobile transaction system 10. Map 310 shows the same area but highlights base stations 210 that are either used to send or receive transactions. For example, the South-West and North-East regions of the map indicate particularly high densities of transactions occurring for base stations 210 located in these areas. These data may be stored with a baseline or expected data set that determines typical transaction geographical distributions during normal periods or where no extraordinary events have occurred. The geographical distribution or density of transactions in any particular area may be monitored to determine if a divergence from the baseline data set has occurred. A divergence of a particular or predetermined amount (0-25% for example) may be allowed without indicating a new event. However, once sufficient divergence occurs then this may indicate an event that requires investigation.

Fraudulent transactions are a concern for all financial networks not least mobile money. Mobile money transfer services do not currently use real-time monitoring to place geographic restrictions on users.

There have been reported incidents where mobile money services have been used by prison inmates to commit further crime whilst still inside prison. This can take the form of extortion or simply fraud. There is the potential for this to damage the reputation of the service.

In mobile money services generally (but not in all cases) charging or crediting funds to the customer works by the customer being able to exchange cash for e-money for free but then the customer pays to send the money and the receiver of the cash may pay to withdraw the money. By providing the exchange of cash for e-money for free you can incentivize uptake of the service. However some customers defraud the system by working with "friendly" outlets or outlets that are not adhering to service terms and conditions. Working with this outlet the customer provides the number of the person he intends to send the money to and the outlet therefore loads the e-money directly on to the handset of the would-be recipient. This results in a "free" transfer for the customer and a loss of revenue for the mobile money provider. This fraud is currently handled by closely managing the outlet network and using techniques that include 'mystery shopper' among others, but there is a desire for improved fraud prevention methods.

When a crime is reported, where a customer has been defrauded, an immediate suspension of the mobile number may be required and then other accounts that the mobile number might have interacted with may be traced, with further action taken where necessary. The problem with this solution is that a reaction takes place after the event has occurred when damage has already been done.

Similarly, direct exchange of cash for e-money are sometimes even harder to determine and tend to rely on reports identifying the time at which a exchange was made and a subsequent withdrawal processed. Also looking at the location (determined by the data collected at the time the outlet joined the service) of the two outlets processing the transactions, then determining if it is feasible for a e-money loading and withdrawal to take place between the two locations may be required.

Figure 4:
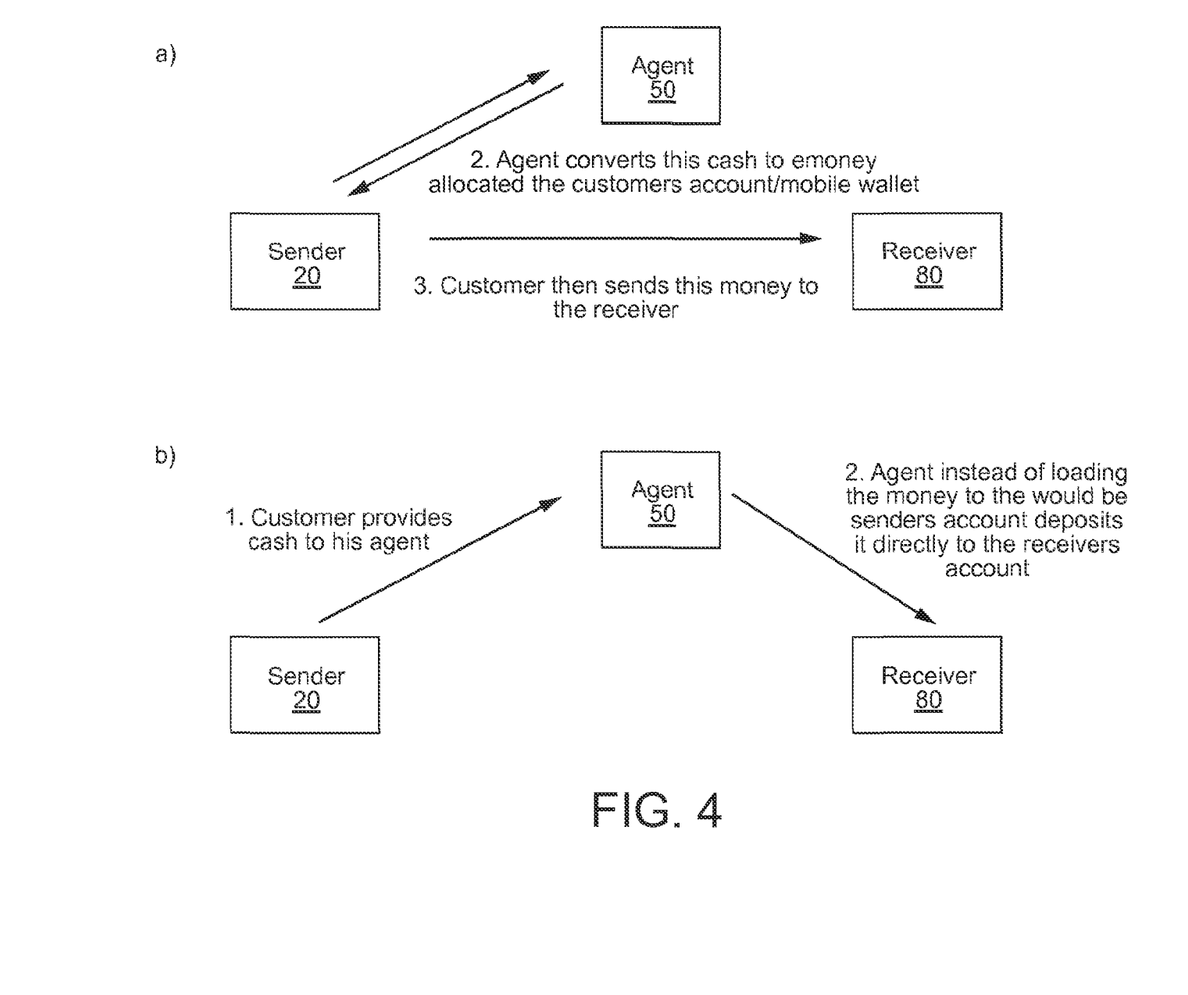
FIG. 4a shows a typical transaction used to send funds between a sender and a receiver.
FIG. 4b shows a non-standard method of sending cash from a sender to a receiver.

FIG. 4a shows a schematic diagram summarising the usual (and intended) method in which electronic money is added to a sender's 20 account and passed onto a receiver 80. The sender 20 gives cash to an outlet 50 who then allocates this money to the sender's 20 account. The sender 20 then sends this money to the receiver 80 using the scheme described with reference to FIG. 1. However, certain parts of this transaction may be subject to commissions and charges. For example a charge is usually levied on the customer sending e-money.

FIG. 4b shows an unauthorised method for carrying out a similar transaction whereby commissions and charges may be avoided. Instead of the outlet allocating the funds to the sender's 20 account, this is loaded directly into the receiver's account. This may require collusion from the outlet 50 but may be difficult to detect.

A position determining process or apparatus may be used to correlate the location of the handsets involved in the mobile money transactions and then validate in real time whether the transactions are permitted to take place. For example, base station information (e.g. identifiers of the base stations used to communicate with the handsets) or the GPS system may be used. Validation may occur in real time so that the transactions can proceed either using a database, such as one containing a blacklist or GPS location information from the outlet 50 or customer 20. The following steps may occur:

1. Customer 20 exchanges cash for e-money at an outlet 70.
   a. Customer 20 gives cash to an outlet 50 to be exchanged for e-money loaded to his mobile wallet.
   b. Outlet 50 uses their mobile handset 30 to initiate e-money loading transaction.
   c. STK application stored on the SIM (or other software application) queries GPS module in the outlet handset 30 to provide the outlets location (alternatively, base station information may be used for this purpose).
   d. Details are sent to the mobile payment solution attempting to validate the details of the transaction. In addition to the usual validation, a request is sent to the handset of the mobile number specified for the loading of e-money to validate its location. If the location of the outlet is not the same (or a close enough) as the location of the customer then the transaction may be rejected.

2. Customer 20 transfers money to another customer 80.
   a. Sender 20 initiates transaction.
   b. STK application queries GPS module in handset (or obtains location from base station information) to record sender's location.
   c. Transfer request is sent to the mobile payment system.
   d. Details sent to mobile payment solution which attempts to validate the details of the transaction. In addition to the usual validation, a request is sent to the handset of the intended recipient to verify their location using GPS, base station information or other means.
   e. The details of the two locations are cross checked against a database that could be a blacklist. If the location co-ordinates (or base station information) are contained in the database then the transaction may be rejected.

Alternatively, in step 2e the database could be a whitelist. In this case, if the location co-ordinates (or base station information) are not contained in the database then the transaction may be rejected.

3. Customer makes a withdrawal.
   a. Customer initiates withdrawal by specifying (using his handset 30) the outlet 50 he wishes to withdraw from.
   b. The STK application queries the location of the customer (GPS, base station or other location determining means).
   c. The details of the customer's location and the transaction details are sent to the mobile payment system.
   d. The mobile payment system then requests the location of the outlet 50.
   e. If the outlet's co-ordinates or location are not the same as the customer's or the outlet co-ordinates are not in the location that were specified for him at the time of launch or registration then the transaction may fail.

Mobile money services are currently in use in countries such as Kenya and Tanzania. In these and other African countries, the availability of valid forms of photo ID and literacy in general is not typically very good, especially in rural areas. This presents problems for any mobile operator or financial network operator in implementing stringent anti-money laundering policies (AML). In addition, the telecoms regulator in many countries requires copies of all photo IDs for anyone who owns a phone. If they can't produce one then they may be disconnected from the service. This requirement may be more important than producing a copy of an address and this may limit a mobile operator's addressable audience.

Such requirements may be satisfied together with improvements in security by providing an enhanced security system.

Registration for mobile money systems may rely on a photocopy of a photo ID of the customer. Photocopiers may not always be available at an outlet.

At the time of registration of a customer the customer's handset 30 may take a photograph of the customer. This photograph may be stored locally but securely within the handset as well as being sent to mobile payments transaction system 200. Optionally, the outlet 50 may further verify the customer using a photo ID with the customer in front of him or continuing to take a copy of the photo ID so that this can be verified centrally by the mobile payments solution against the photo image taken using the handset or attached camera (with the appropriate security protocols in place to protect the photo ID during storage and transmission against unauthorised access and use).

Figure 5:
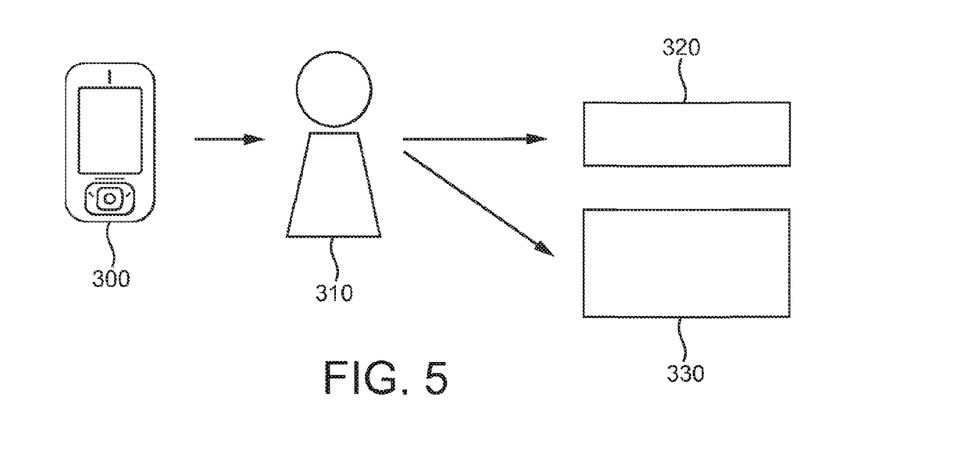
FIG. 5 shows a schematic diagram of a system for improving security when registering a user in a mobile transaction system.

FIG. 5 shows schematically the registration procedure. The user 20 visits the outlet 50 to register for the mobile payment service 300. The user 20 provides their identification details including the name and address and an image of the user 20 is taken using the user's handset 30 (step 310). This image may be stored locally on the handset 30 in a secure manner and preferably secure from tampering (step 320). The handset 30 may also send the image of the user 20 to the mobile transaction system 200 for storage and/or validation (step 330).

Figure 6:
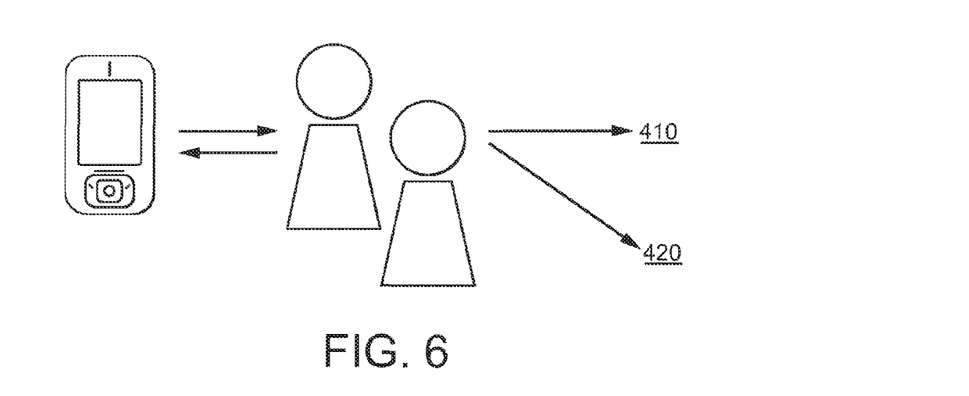
FIG. 6 shows a schematic diagram indicating further enhanced security methods used during mobile transactions.

FIG. 6 shows schematically the steps taken to validate a transaction. As described with reference to FIG. 1, the user 20 may initiate a sending transaction of funds to a receiver 50. However, the process includes taking a further photograph of the sender using the handset 30. This new image may be compared with the securely stored image on a handset preferably using software within the handset itself. Known image or face recognition software may be used.

At step 410 a confirmation occurs that the image is matched to a sufficient degree and the transaction is allowed to proceed. However, if a match does not occur then the transaction is not allowed to proceed and fails at step 420.

Therefore, security of the system may be enhanced without requiring further external security measures that may be difficult to acquire or maintain.

Figure 7:
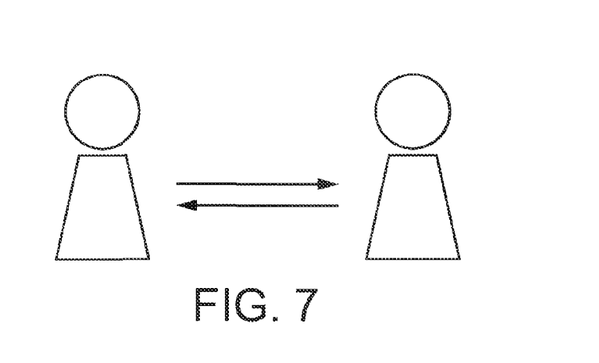
FIG. 7 shows a schematic diagram indicating an improved security system for validating a user account in a mobile transaction system.

FIG. 7 shows a further enhancement whereby the image stored on the handset is sent periodically to the mobile transaction processing system 200 using the phone's data connection. This received image is compared with the original image supplied at the time of registration (again using face or image recognition software) and stored within the database. If the image is no longer the same then the account may be suspended.

Aggregation of data within a mobile network may be used to generate a verifiable credit history for a mobile customer. Currently, there is no way to combine and analyse this information. Sources of data may include customer mobile top up data and mobile money transfer data. The resulting analysis may be shared with external organisations. Any solution must of course take into account the appropriate consumer protections associated with credit reports, and accommodate legal regimes regulating the sharing of telecommunications data.

Many customers who use mobile airtime and mobile money transfer services will not have bank accounts. This may be due to a number of facts including the inability to meet account requirements, cultural perceptions of bank accounts or physical location far from financial institutions. As they do not use traditional financial products these customers do not have a recorded credit history. A credit history is a pre-requisite for certain financial products (e.g. loans). As financial institutions lack this information they tend to exclude these customers from these services. Therefore, a section of the population may remain without access to these sorts of financial services.

Some financial institutions (e.g. micro finance institutions, MFIs) will offer customers small loans without a credit history. Once the customer has repaid this the institution a larger loan may be offered. This may help the customer build a recorded credit history. However, in order to reduce the risk of default, such loans are generally extended to groups (the group is responsible for the full loan amount, if any individual defaults), which is a cumbersome methodology. The extension of loans to customers without credit history does occur but carries a higher risk. This risk is covered by higher interest rates (for MFI loans the lowest interest rate in the Kenyan market is approximately 22% per annum).

Figure 8:
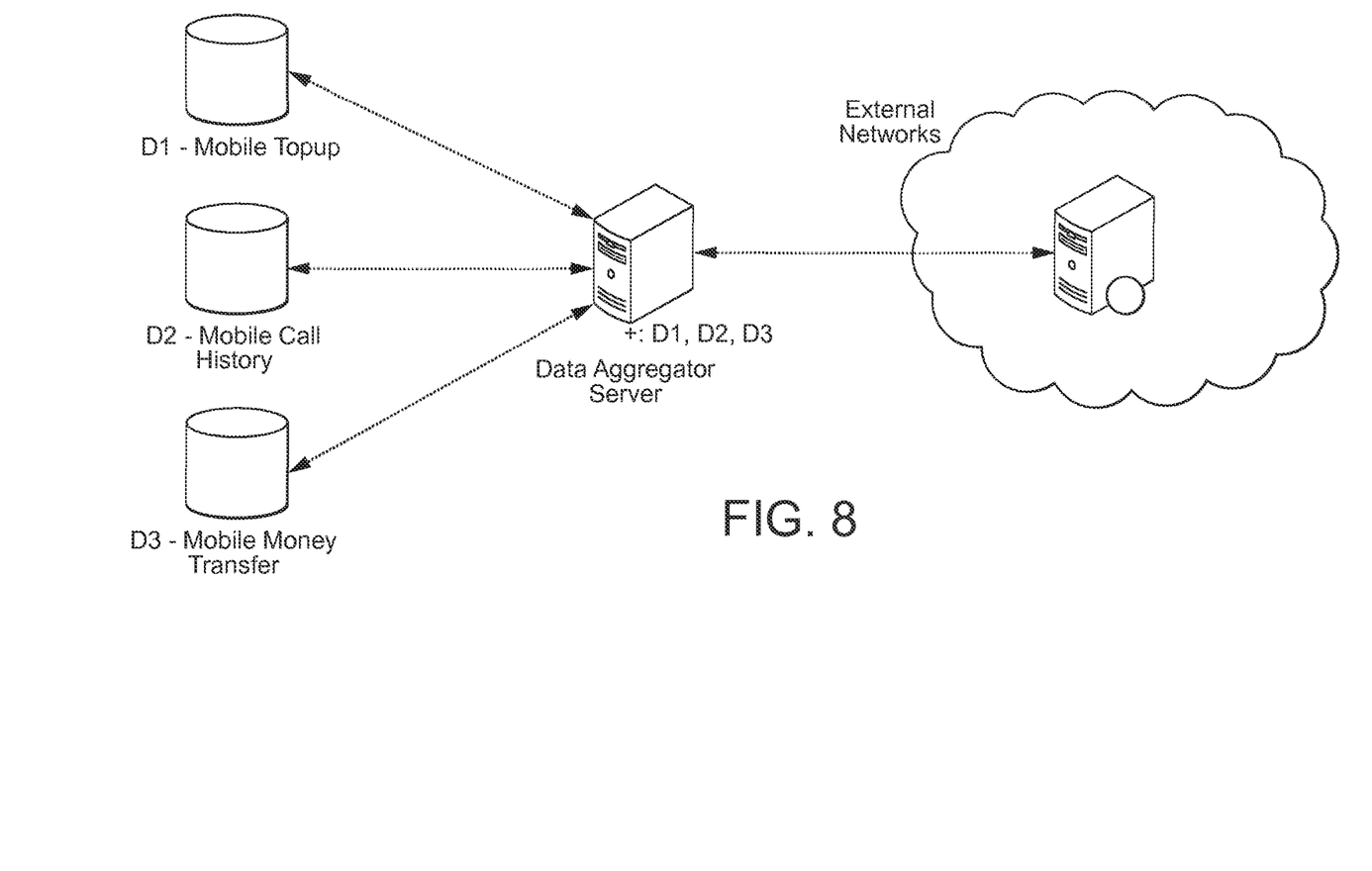
FIG. 8 shows a schematic diagram of a system used to build a recorded credit history of users within a mobile transaction system.

FIG. 8 shows an aggregator of mobile data to produce a credit history.

Each data source can provide different insights to customer behaviour and linked to their predicted credit worthiness.

Mobile Money Transfer Data—mobile money transfer services are being deployed in many countries. Their uptake is driven by an unmet need for transactional financial services at a price point which cannot be met by traditional financial institutions. The services allow customers to exchange cash for e-money and withdrawal cash from an e-money account, linked to their phone number, at local outlets. When the account has been credited with e-money this can be transferred to other users (e.g. customers, businesses, merchants) or used to buy airtime.

Analysis of these transactions can provide information about the customers' cash flow (e.g.):
  Average amount loaded into the account and frequency of top-ups.
  Average amount withdrawn from the account and frequency of withdrawals.
  Running balance over a certain time period.

As the e-money ecosystem includes other organisations, further information about the customer can be obtained:
  Which businesses do they make payments to? (e.g. electricity, water, TV).
  Are these payments regular or ad-hoc?
  Which outlets do they exchange cash for e-money and vice-versa?
  Do they use ATM machines to withdraw cash (possible using handset based transactions)?
  Do they send or receive money to other users regularly? If so, how often and over what time period are they a net receiver or sender?

Mobile Top-up Data—in many emerging markets the majority of customers will have pre-pay phones. This data can be analysed in terms of:
  How frequently does the customer buy airtime?
  In what denominations does the user buy airtime?
  Does the user receive airtime from 3rd parties?

Mobile History Data—mobiles services, utilising voice and SMS, are now ubiquitous across the world. Analysis of data about usage patterns can help to answer the following:
  How does the user spend their airtime?
  Do their spending habits change in relation to their airtime balance?

Aggregation of these data sources followed by analysis may be used to build a credit history. Weighting can be applied to individual data sets to take into account importance of predicting future customer behaviour. Once the internal data has been analysed this can be shared with external parties, subject to compliance with the appropriate consumer protections associated with credit reports and regulations governing the sharing of telecommunications data. This may be useful to support applications for traditional financial services, especially for customers who are new to such services.

Using Kenya as an example, approximately 9 million customers are registered to use the M-PESA mobile money transfer and payments service. One source of finance for the poor is micro finance institutions (MFI). The Association of Microfinance Institutions of Kenya (AMFI) has 43 member institutions which support over 6 million poor and middle class families. As of 2010, their total outstanding loan portfolio stands at $303 million. The ability of these types of institutions to receive better information from their customers, particularly by way of credit histories as discussed above, may help them to make informed decisions about how to run their businesses. By rating customers, it should be possible to achieve lower default rates. This in turn should enable these institutions to decrease the interest rates which they charge—providing benefits to their customers.

As will be appreciated by the skilled person, details of the above embodiment may be varied without departing from the scope of the present invention, as defined by the appended claims.

For example, transaction acknowledgment may be by other means such as audio confirmation, for example. Anomalies in geographical distribution may be highlighted on maps or by alerts generated without initial display on a map. The systems described above may be operated on any mobile format or band such as GSM or CDMA, for example.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A computer-implemented method for analyzing mobile handset based transactions between sender handsets and receiver handsets, the computer-implemented method comprising:
  a computing system accessing and storing a mobile base station identifier that is generated in response to one or more SMS confirmation message being sent to a sender handset and a receiver handset as part of a mobile handset based transaction;
  the computing system determining locations of the sender handset and the receiver handset which were sent the one or more SMS confirmation for the mobile handset based transaction, the locations of the sender handset and the receiver handset being based on mobile base station information accessed with at least the mobile base station identifier, as well as being based on triangulation data associated with one or more additional mobile base stations, wherein determining at least one location of said locations is based on the mobile base station identifier without relying on GPS hardware of either the sender handset or the receiver handset, such that the at least one location is determined independently of any of the triangulation data;
  the computing system determining a geographical distribution of a plurality of mobile handset based transactions based on identified locations of a plurality of mobile handsets, including the sender handset and the receiver handset for a geographic region;

the computing system accessing a baseline data set of mobile handset based transactions for the geographic region; and the computing system identifying anomalies between the determined geographical distribution with the baseline data set.

2. The method of claim 1, wherein the geographical distribution and the baseline data set are geographical densities of transactions.

3. The method of claim 1, further comprising determining whether the geographical distribution and the baseline data set are within a predetermined limit.

4. The method according to claim 1, further comprising using mobile base station information recorded when the mobile handset based transaction is executed.

5. The method according to claim 1, wherein the mobile base station identifier is used to transmit the one or more SMS confirmation message.

6. The method according to claim 1 further comprising storing a number of transactions at a base station or at an external server.

7. The method according to claim 1 further comprising the step of displaying the geographical distribution on a map.

8. The method of claim 7 further comprising highlighting transaction routes between base stations on the map.

9. The method of claim 8, wherein the anomalies are shown on the map.

10. A mobile handset transaction system comprising:
a mobile base station that communicates with a sender handset and a receiver handset during a mobile handset transaction, the mobile base station recording mobile base station information in response to sending one or more confirmation SMS message to a sender handset and to a receiver handset;
a processor configured to execute transactions between sender handsets and receiver handsets, including said sender handset and said receiver handset; and
a server configured to:
identify locations of the sender handset and the receiver handset using the recorded mobile base station information and proximity data associated with the mobile base station and at least one of the sender handset and the receiver handset, wherein determining at least one location of said locations is based on GPS hardware of either the sender handset or the receiver handset and wherein determining at least a second location of said locations is based on the mobile base station identifier without relying on any GPS hardware of either the sender handset or the receiver handset,
determine a geographical distribution of mobile handset based transactions based on identified locations, the identified locations including the locations of the sender handset and the receiver handset that are based on the mobile base station information and the proximity data,
identify anomalies by comparing the determined geographical distribution with a stored data set that identifies an expected geographical distribution of mobile handset transactions for a geographic region; and
generate an interface that reflects the geographical distribution of mobile handset based transactions and the anomalies.

11. A computer program product comprising non-transitory computer readable medium having stored thereon computer executable program instructions that, when executed on a computing system having a processor, cause the computing system to perform the following:
the computing system accessing and storing a mobile base station identifier that is generated in response to one or more SMS confirmation message being sent to a sender handset and a receiver handset as part of a mobile handset based transaction;
the computing system determining locations of the sender handset and the receiver handset which were sent the one or more SMS confirmation for the mobile handset based transaction, the locations of the sender handset and the receiver handset being based on mobile base station information accessed with at least the mobile base station identifier, as well as being based on proximity data associated with the mobile base station and at least one of the sender handset and the receiver handset, wherein determining at least one location of said locations is based on GPS hardware of either the sender handset or the receiver handset and wherein at least a second location of said locations is based on the mobile base station identifier without relying on any GPS hardware of either the sender handset or the receiver handset;
the computing system determining a geographical distribution of a plurality of mobile handset based transactions based on identified locations of a plurality of mobile handsets, including the sender handset and the receiver handset for a geographic region;
the computing system accessing a baseline data set of mobile handset based transactions for the geographic region; and
the computing system identifying anomalies between the determined geographical distribution with the baseline data set.

12. The computer program product of claim 11, wherein the computer executable program instructions further cause the computing system to generate an interface that reflects the geographical distribution of mobile handset based transactions and the anomalies.

* * * * *